Sept. 11, 1962  J. E. SHALEK  3,053,110
FLOATING LOCK FOR A SHAFT AND THE LIKE
Filed May 5, 1959  2 Sheets-Sheet 1

INVENTOR.
Joel E. Shalek
BY
Rines and Rines
ATTORNEYS

INVENTOR.
Joel E. Shalek
BY Rines and Rines
ATTORNEYS

3,053,110
FLOATING LOCK FOR A SHAFT AND THE LIKE
Joel E. Shalek, Brighton, Mass., assignor to Sanborn Company, Waltham, Mass., a corporation of Massachusetts
Filed May 5, 1959, Ser. No. 811,181
5 Claims. (Cl. 74—504)

The present invention relates to shaft locks and the like and, more particularly, to non-shifting no-torque floating locks.

It is frequently desirable to lock a shaft or the like in a fixed position without shifting the position of the shaft during the locking operation. In connection with variable electrical articles or components, for example, such as potentiometers, capacitors or other devices, once the shafts of such components are set at predetermined rotational positions, representative of predetermined electrical settings of the components, it is often necessary to lock the shafts so that the said electrical settings cannot be accidentally or otherwise changed. Numerous types of lock nuts and other locking apparatus have been proposed and employed for this purpose, but the locking and unlocking of such nuts or other apparatus customarily exerts rotational torque effects upon the shaft itself resulting in slight and undesirable shifting of the rotational position of the shaft.

An object of the present invention, accordingly, is to provide a nut and improved floating shaft lock that, during both locking and unlocking, exerts no rotational torque upon the shaft and, hence does not shift or otherwise disturb the setting thereof.

A further object is to provide a novel lock for a shaft and the like that is of more general utility, also.

Other and further objects will be explained hereinafter and will be more particularly pointed out in connection with the appended claims.

The invention will now be described in connection with the accompanying drawing, FIG. 1 of which is a side elevation, partly in longitudinal section, illustrating a preferred embodiment of the invention with the parts in unassembled, exploded position;

Figure 1:
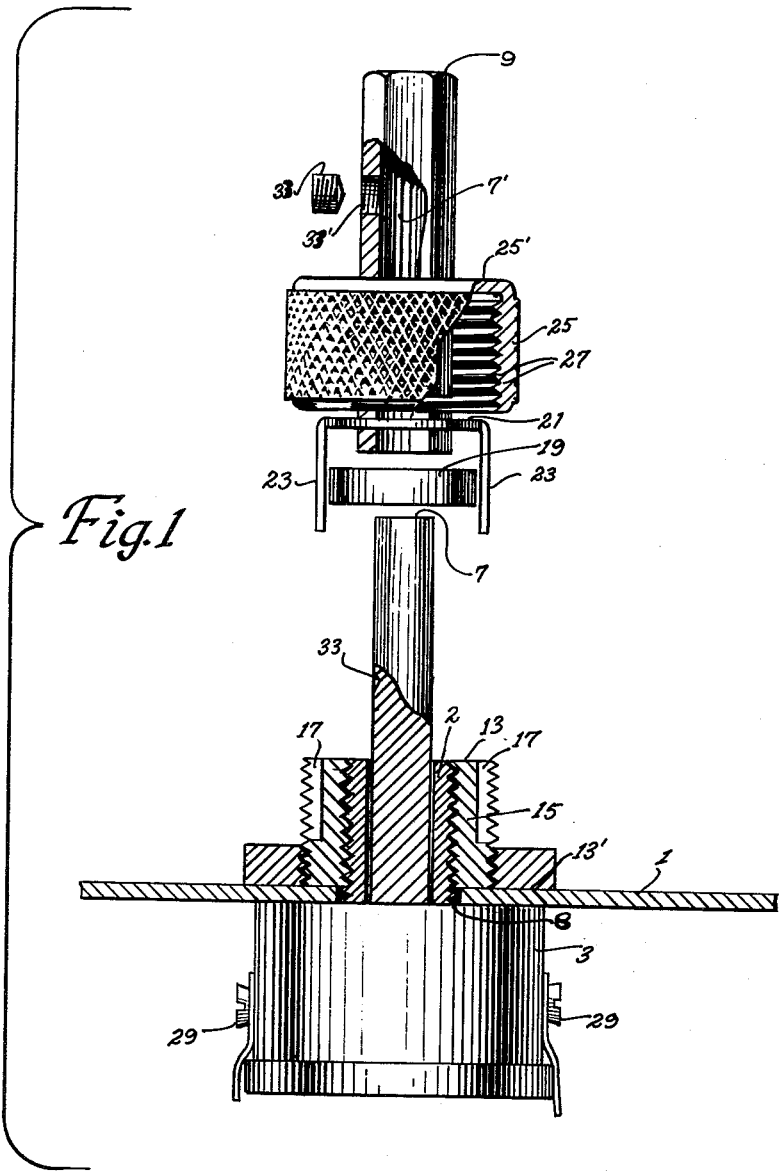

Referring to FIG. 1, an electrical component, such as a potentiometer 3, or any other desired article, is shown provided with a shaft 7, the rotational position of which adjusts the setting of the component, as is well known. The component 3 is mounted upon one side of a chassis or other panel 1, shown as the lower side, with the shaft 7 extending through a threaded sleeve member 2 secured to the potentiometer 3 adjacent the inner end of the shaft 7, to permit adjustment of the shaft on the other or upper side of the panel 1. The sleeve member 2 may be passed through an aperture 8 in the panel 1 to effect this end. Electrical connections to the terminals 29 of the potentiometer component 3 may be made on the said lower side of the panel 1.

The rotational setting of the shaft 7 may be effected through the medium of a knob 9, illustrated as of polygonic cross-section, such as, hexagonal. The knob 9 may be recessed at 7', FIG. 1, to receive the free end of the shaft 7, and it may be locked thereto by a set screw 33 adjusted within a transverse threaded aperture 33' into contact with the shaft 7.

An interiorly and exteriorly threaded cylindrical bushing 15 is provided for threaded mounting upon the sleeve member 2, with an inner bearing surface 13' engaging the panel 1, thus to secure the component 3 to the panel 1. The bushing 15 has an outer annular bearing surface 13 and a pair of lateral slots or guides 17 formed longitudinally in the outer threaded surface thereof.

Figure 2:
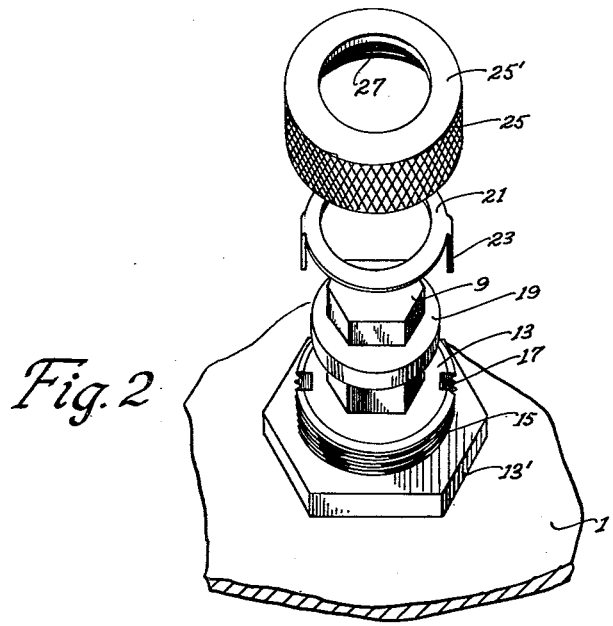
FIG. 2 is a perspective view of the same.
Figure 3:
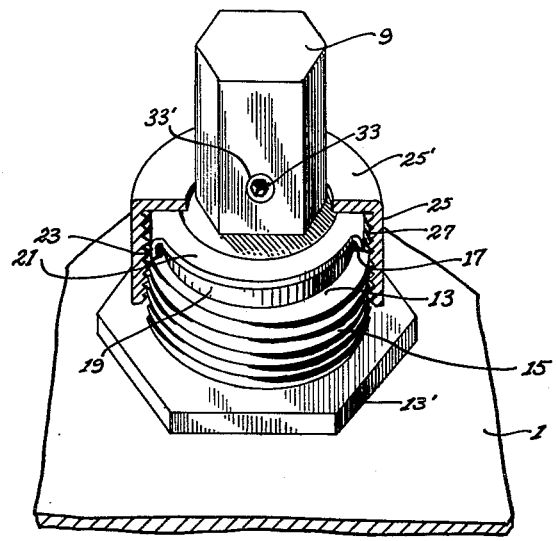
FIG. 3 is a similar view, partly broken away, of the assembled parts.

A first washer 19 of compressible resilient material, such as nylon or the like, and having a central aperture of substantially the same hexagonal or other cross-sectional configuration as the knob 9, FIGS. 2 and 3, is snugly fitted over and around the knob 9 and rotatably locked thereto (as by having an aperture similarly shaped to a polygonic or other non-circular cross-sectioned knob or by being keyed to a circular knob) with its inner or lower surface adjacent the said annular bearing surface 13 of the bushing 15.

A second washer 21 of larger central aperture is loosely fitted over the knob 9, the washer 21 having a pair of longitudinally depending projections 23 of dimensions appropriate to permit their fitting and locking within the bushing lateral slots or guides 17, FIG. 3, and being guided with minimum clearance for free lateral action without twisting to assure no rotational movement. A locking nut 25, having interior threads 27 for cooperating with the exterior threads of the bushing 15 and an inwardly extending upper flange 25' at its upper or outer end, is also loosely fitted over the knob 9 and is threaded upon the bushing 15. As the locking nut 25 is thus threaded down upon the bushing 15, the inner surface of its upper flange 25' bears upon the outer or upper surface of the washer 21, forcing the lower surface of the washer 21 against the resilient compressible washer 19, with the projections 23 locked within the guides 17. The inner or lower surface of the washer 19 will thus engage the upper or outer annular bearing surface 13 of the bushing 15. The shaft 7 has thus been locked in position without exercising any rotational torque upon the knob 9 or shaft 7 by clamping the washer 19. The washer 19, of course, when not clamped, turns with the knob 9 but is not permanently affixed thereto. Similarly, no torque is exerted upon the knob 9 or shaft 7 in releasing the clamping action of the locking nut 25, so that the desired rotational position of the shaft 7 is undisturbed during the floating locking and unlocking operations.

Further modifications will occur to those skilled in the art and all such are considered to fall within the spirit and scope of the invention, as defined in the appended claims.

What is claimed is:

1. A floating lock for a shaft and the like having, in combination, a knob adapted to be secured to the shaft and the like, an externally threaded bushing fixedly disposed at the inner end of the knob and provided with guide means and an outer end bearing surface, a first washer of compressible resilient material shaped to fit snugly over and around the knob, and rotatably locked thereto, with its inner surface adjacent the said bushing bearing surface, a second washer loosely fitted over the knob to engage the outer surface of the first washer and provided with projection means for fitting within the bushing guide means, and an interiorly threaded nut in threaded engagement with the external threads of the bushing, the nut having an inwardly extending flange at its outer end for bearing upon the outer surface of the second washer as the nut is threaded upon the bushing.

2. A floating lock for a shaft and the like associated with an article to be mounted upon an apertured panel with the article disposed on one side of the panel and the shaft extending through the aperture on the other side of the panel, the lock having, in combination, a knob adapted to be secured to the shaft and the like on the said other side of the panel, an externally threaded bushing fixedly disposed at the inner end of the knob and provided with guide means, an inner end bearing surface for engagement with the panel and an outer end bearing surface, a first washer of compressible resilient material shaped to fit snugly over and around the knob, and rotatably locked thereto, with its inner surface adjacent the said bushing outer bearing surface, a second washer loosely fitted over the knob to engage the outer surface of the first washer and provided with projection means for fitting within the bushing guide means, and an interiorly threaded nut in threaded engagement with the external threads of the bushing, the nut having an inwardly extending flange at its outer end for bearing upon upon the outer surface of the second washer as the nut is threaded upon the bushing.

3. A floating lock for a shaft and the like having, in combination, a knob adapted to be secured to the shaft and the like, an externally threaded bushing fixedly disposed at the inner end of the knob and provided with a pair of lateral guides and an outer end bearing surface, a first washer of compressible resilient material shaped to fit snugly over and around the knob, and rotatably locked thereto, with its inner surface adjacent the said bushing bearing surface, a second washer loosely fitted over the knob to engage the outer surface of the first washer and provided with a pair of projections for fitting within the pair of guides, and an interiorly threaded nut in threaded engagement with the external threads of the bushing, the nut having an inwardly extending flange at its outer end for bearing upon the outer surface of the second washer as the nut is threaded upon the bushing.

4. A floating lock for a shaft and the like having, in combination, a polygonic knob adapted to be secured to the shaft and the like, an externally threaded cylindrical bushing fixedly disposed at the inner end of the knob and provided with guide means and an outer end annular bearing surface, a first washer of compressible resilient material having a polygonic aperture shaped to fit snugly over and around the polygonic knob with its inner annular surface adjacent the said bushing annular bearing surface, a second washer loosely fitted over the knob to engage the outer annular surface of the first washer and provided with projection means for fitting within the bushing guide means, and an interiorly threaded nut in threaded engagement with the external threads of the bushing, the nut having an inwardly extending flange at its outer end for bearing upon the outer surface of the second washer as the nut is threaded upon the bushing.

5. A floating lock as claimed in claim 4 and in which the said compressible resilient material is constituted of nylon and the like.

References Cited in the file of this patent

UNITED STATES PATENTS

| | | |
|---|---|---|
| 938,984 | Curry | Nov. 2, 1909 |
| 1,185,854 | Stieglitz | June 6, 1916 |
| 1,256,201 | Clark | Feb. 12, 1918 |
| 1,735,949 | Brady | Nov. 19, 1929 |
| 2,468,281 | Wildern | Apr. 26, 1949 |
| 2,799,170 | Davis | July 16, 1957 |
| 2,833,158 | Damon | May 6, 1958 |
| 2,836,989 | Schultz | June 3, 1958 |
| 2,845,145 | Lee | July 28, 1958 |
| 2,900,148 | Nickels | Aug. 18, 1959 |

FOREIGN PATENTS

| | | |
|---|---|---|
| 191,457 | Great Britain | Jan. 11, 1923 |
| 710,530 | Great Britain | June 16, 1954 |
| 572,660 | Canada | Mar. 24, 1959 |